(12) United States Patent
Gerder et al.

(10) Patent No.: US 7,389,202 B2
(45) Date of Patent: Jun. 17, 2008

(54) MODULAR SYSTEM AND PROCESS FOR OBTAINING MEASURED DATA AND FOR FORWARDING THEM IN A RADIO-BASED MANNER

(75) Inventors: Henning Gerder, Lübeck (DE); Udo Beckmann, Stockelsdorf (DE)

(73) Assignee: Drägerwerk Aktiengesellschaft, Lübeck (DE)

( * ) Notice: Subject to any disclaimer, the term of this patent is extended or adjusted under 35 U.S.C. 154(b) by 178 days.

(21) Appl. No.: 11/368,905

(22) Filed: Mar. 6, 2006

(65) Prior Publication Data
US 2007/0006156 A1 Jan. 4, 2007

(30) Foreign Application Priority Data
May 19, 2005 (DE) ...................... 10 2005 022 989

(51) Int. Cl.
*G06F 11/30* (2006.01)

(52) U.S. Cl. ........................ 702/183; 706/33; 709/200; 709/224

(58) Field of Classification Search ................ 702/183; 706/33; 709/200, 224
See application file for complete search history.

(56) References Cited

U.S. PATENT DOCUMENTS

| 6,522,531 | B1 * | 2/2003 | Quintana et al. ........... 361/683 |
| 6,735,630 | B1 * | 5/2004 | Gelvin et al. ............... 709/224 |
| 7,191,097 | B1 * | 3/2007 | Lee et al. ................... 702/183 |

FOREIGN PATENT DOCUMENTS

EP 0 526 686 A1 3/1993

* cited by examiner

*Primary Examiner*—John E. Barlow, Jr.
*Assistant Examiner*—Hien Vo
(74) *Attorney, Agent, or Firm*—McGlew and Tuttle P.C.

(57) ABSTRACT

A modular system and process for obtaining measured data and forwarding them in a radio-based manner is based on a plurality of modules. The modules contain at least one device (31) for obtaining measured data, a device (32) for transmitting the measured data by radio, a device (33) for receiving data sent by other units, as well as device (34) for generating a transmissible code containing additional data, wherein the device (32) for transmitting the measured data and the device (33) for receiving data sent by other units together function as a repeater (35).

27 Claims, 5 Drawing Sheets

MODULAR SYSTEM AND PROCESS FOR OBTAINING MEASURED DATA AND FOR FORWARDING THEM IN A RADIO-BASED MANNER

CROSS REFERENCE TO RELATED APPLICATIONS

This application claims the benefit of priority under 35 U.S.C. § 119 of German Patent Application DE 10 2005 022 989.1 filed May 19, 2005, the entire contents of which are incorporated herein by reference.

FIELD OF THE INVENTION

The present invention pertains to a modular system and to a process for obtaining measured data and for forwarding them in a radio-based manner.

BACKGROUND OF THE INVENTION

It is frequently necessary to obtain measured data at different sites simultaneously or topically and to subject them to central processing and/or evaluation. Sensors, which are suitable for obtaining the measured data of interest, are usually placed for this purpose at the corresponding measurement sites. The sensors are connected to a central processing or evaluating unit predominantly in one of two ways, namely, in a cable-based or radio-based manner. Typical applications of such a system of obtaining measured data can be found in the area of safety engineering, especially the atmospheric monitoring of industrial plants, buildings, and the like.

Established, wired systems for connecting sensors to a central evaluating unit are known. For example, a 4-20 mA interface, Ethernet-based LAN applications, various home installation bus systems (LON, EIB) or bus systems from the area of automation engineering (ProfiBus DP) may be used. Cable-based systems usually mean, however, a great effort for installation or they cannot be used for certain installations at all, where installation would meet insurmountable obstacles. A subsequent integration of wired systems in an already existing infrastructure is often also especially costly.

The alternative is often seen in radio-based systems, which are likewise available in established standard applications. WLAN, Bluetooth or ZigBee can be mentioned in this connection, which are frequently used for applications in which wired systems would represent a great installation effort.

A radio-based system for obtaining data in a locally resolved manner requires a functioning radio connection to the central evaluating unit for each measuring site. This radio connection may be built up either directly from the measuring site to the evaluating unit or maintained via various repeaters to increase the range.

It is common to all radio systems that the maximum range, which corresponds to a set transmitting power, may be markedly reduced by structural conditions, for example, by walls or ceilings as well as obstacles in the terrains. The maximum range may thus shrink in WLAN applications from about 100 m to less than 10 m. It is known that the transmitting power can be drastically increased or additional repeaters can be arranged in the transmission path to compensate this reduction in range.

High transmitting powers mean numerous drawbacks, on the one hand. One of these drawbacks is the increase in power consumption, which means a considerable disadvantage especially in radio-based systems, which are often at least partially battery-operated, because a reduction of the use time is inevitably associated with an increase in the transmitting power.

Another drawback is the potential for interference, which originates from transmitters operated at high power. High transmitting power implies the risk that analog signals of sensors are interfered with, which may lead even to the temporary failure of measured data acquisition.

The installation of additional repeaters at closely spaced locations means, on the other hand, an increase in the cost and an increase in maintenance effort. Another drawback of the systems mentioned is the susceptibility or dependence of the data transmission on the functioning of the transmission path itself. A break in the radio connection or interruption of the data line may lead to total loss of the measured data received and evaluation may become impossible. This represents a safety-relevant shortcoming especially in monitoring systems.

SUMMARY OF THE INVENTION

The object of the present invention is to provide a possibility of obtaining measured data from measuring sites distributed in space simultaneously or topically and to send them to a central evaluating unit, which makes do without the installation effort needed for wired data transmission and at the same time makes it possible to obtain and transmit measured data to the central evaluating unit possibly unaffected by transmission units with high reliability of transmission.

According to the present invention a modular system is provided for obtaining measured data and for forwarding them in a radio-based manner, which said system comprises a plurality of modules, which contain each at least one means for obtaining measured data, a means for sending the measured data by radio and a means for receiving data sent from other modules, as well as means for generating a code that contains additional data and can be transmitted. The means for sending the measured data by radio and the means for receiving data sent by other modules are configured such that they can operate as an automatic repeater. The means for obtaining measured data may be various sensors, which are prior-art per se, especially electrochemical gas sensors, optical sensors, pyroelectric sensors and many other electronic or other devices suitable for obtaining data. Means for sending the measured data by radio are usual transmission units, whose power can preferably be set. Means for receiving data sent by other modules are electronic assembly units, which can function as receivers.

Due to their sensor function, modules of such a design are able to obtain measured data at the site at which they are installed and to send these data via the transmission unit. At the same time, the modules can receive radio signals, which enter them, and send them again via their transmission unit, as a result of which the modules equipped in this manner have a dual function: First, the obtaining of measured data at the site of their installation and second, the function of a repeater, likewise at the site of their installation.

A central evaluating unit receives data from all modules, which are in direct radio contact with the central evaluating unit. Due to the repeater function of the modules, which are in direct radio connection with the central evaluating unit, it is, however, possible that measured data that originate from modules arranged at a greater distance will also arrive at the central evaluating unit. To make possible the assignment in space of the data obtained in the central evaluating unit, the individual modules have additional means for generating a transmissible code containing additional data. Important additional data of this code shall be data that identify the particular transmitting module or an indication of which module has actually obtained the transmitted data. The code containing additional data may, furthermore, contain data on whether there is an alarm situation at the site of the individual module.

It is advantageous if data on the sites at which modules according to the present invention are installed are available mapped in such a way that at least the central evaluating unit can access these data. This can be embodied, for example, by electronic maps, which are stored in the central evaluating unit.

Both the site at which the measured data are obtained and the transmission path between the site at which the measured data are obtained and the central evaluating unit can be reconstructed in this manner in the central evaluating unit, i.e., it can be reconstructed which modules were participating in the transmission.

To avoid the superposition of the radio signals arriving from different modules at the central evaluating unit or in case of intercalated repeaters, it is useful to assign a special time window to each module for sending its data. This assignment may be fixed in hardware or effected by an initialization step. The individual modules have to be arranged in an area to be monitored at first such that it is possible to obtain data at the measurement sites of interest. Moreover, the arrangement is selected according to the present invention such that data sent by a module are also received by a plurality of modules, at least a few adjacent modules. The sending of the received signals according to the present invention, which is possible as a result, causes that obtained measured data can always be sent redundantly to the central evaluating unit over a plurality of transmission paths. By varying the transmitting power of the individual modules, it is, moreover, possible to identify transmission sections that require an especially low transmitting power. In case of bidirectional utilization of the transmission path, settable parameters can be preset at the individual modules by the central evaluating unit and adapted after individual data evaluations. It is thus possible to adapt the individual transmission paths to the central evaluating unit to the regional conditions, i.e., the transmitting power of the individual modules can be reduced to the extent that only a still sufficient number of transmission paths to the central evaluating unit are maintained to guarantee the redundancy that is desired or specified for safety reasons. If an individual module fails, measured value acquisition is either no longer possible at that site, or a transmission path will not function any longer due to the elimination of the repeater device installed there. In case of a preset minimum number of transmission paths, data transmission from all other measuring sites to the central evaluating unit will not be compromised by such an event. It is thus possible to build highly redundant systems that can be adapted to different safety requirements. At the same time, it is possible to minimize the transmitting power, which leads to an increase in the resistance to interference and increases the operating time in case of battery operation. Due to the fact that individual time windows are specified for the transmission by the individual modules, it is, moreover, possible to completely switch off the transmitter connected to that module or to allow it to remain in a sleep mode. Especially high level of reliability can thus be achieved during the measured value acquisition, because the interference potential of the particular transmitter is switched off. Another advantage of the device according to the present invention is the optimization, in principle, of the radio transmission path, which generally permits the use of low radio powers. It is thus advantageously possible to embody modules that make do with a transmitting power below 10 mW, as a result of which such modules can be installed without a license in any desired environment.

In another advantageous safety-relevant embodiment, obtained measured data are compared with a threshold value, and exceeding this threshold value leads to the triggering of various alarm functions. For example, as an additional data triggering alarm functions, this exceeding of a threshold value may be part of the transmissible code, which is generated in every module.

When an alarm situation appears, it is possible to respond to it in many different ways. Thus, it is advantageous in an alarm situation to change the polling cycle of the individual modules in such a way that measured data from the site of the detected alarm situation are sent preferably or more frequently to the central evaluating unit. A combination with other safety mechanisms or actuation of devices for eliminating the state causing the state of alarm by the central evaluating unit are likewise advantageous.

An advantageous reduction of the transmitting power during normal operation leads to an automatic increase in the operating time of mobile power supply systems. The adaptation of the transmission paths according to the present invention to environmental conditions also makes it possible in an advantageous manner to adapt the system to changing obstacles or to obstacles that are introduced into the transmission path later and could interfere with or compromise transmission.

Moreover, it is advantageous that it is possible without problems to connect additional modules into the system if the needs change. A combination of permanently installed modules with temporarily stationary modules, for example, on stands, and mobile movable modules, which can be moved, for example, by persons in an area to be monitored, is also possible in this connection. Modules should be considered for this purpose as part of protective and safety clothing or of portable measuring devices. In addition, it is advantageous if the individual modules contain one or more interfaces, via which mobile devices can be connected. Both calibration of the sensor and an exchange of power reserves still present can take place via these interfaces. Advantageous interfaces are, for example, Ethernet, RS232, USB, Firewire, CAN, and the like.

Data fed into individual modules via these interfaces van be treated as data obtained from the particular module, i.e., they can likewise be sent directly or indirectly to the central evaluating unit. Before these data are sent, an additional code is advantageously added, which indicates that the data obtained do not originate from a sensor assigned to the module, but from a device connected via an interface.

Furthermore, it may be advantageous to combine the modules according to the present invention with other modules, in which the obtaining of measured data and the sending of data take place such that these operations are separated in space. This may be advantageous especially if a high level of safety in obtaining and transmitting data is important at individual sites and time-split data obtaining and transmission cannot be considered.

Furthermore, it is advantageous to match measured data obtaining with position data that should be available at least in the central evaluating unit. These position data can be obtained from digitized building plans, topographic data sets and the like. If the measured data obtained at individual sites are provided with a time stamp, it is also possible to follow up the spread of a situation characterized by measured data in space with the system according to the present invention.

An especially high level of versatility of a system according to the present invention is obtained if some of the modules or all modules can function as sensors for obtaining measured data, as repeaters for sending received data in a radio-based manner and as masters for collecting the data obtained and/or sent by the individual modules and for coordinating the transmission operation and for initializing the system. The function of a master is assigned to the particular module. This assignment can be advantageously carried out via an interface in the particular module. Additional data, which are otherwise needed predominantly in the central evaluating unit, can be made available to the module intended as a master in the course of the assignment. As a result, it becomes possible to install another central evaluating unit and to continue to use the modules that continue to be available for measured data acquisition even in case of failure of the central evaluating unit by using a remotely located module and the interface thereof.

Using a plurality of modules as masters, it is also possible to initialize a plurality of local partial networks, which communicate with one another via the masters. The amount of data generated can thus be kept within manageable limits even in case of a very large number of measuring sites. The communication of the masters with a central evaluating unit can in turn take place via a redundant network in the sense of the present invention or via conventional radio-based or cable-based systems.

The transmitting power of the individual sensor nodes needs to be set only so high that each sensor can communicate with the evaluating unit belonging to it via a plurality of paths, but at least via two paths. The distances between the nodes, i.e., the sites at which modules according to the present invention are installed, should be short in order to make it possible to operate with a low transmitting power. The modules according to the present invention are advantageously equipped for this purpose with means for the remotely controllable setting of the transmitting power and with means for measuring the receiving level.

The transmission of data takes place in the normal measuring operation in a relatively slow time cycle, for example, in the minute range, when this is related to the measuring and transmitting sensor nodes. Since the nodes that are placed closer to the central evaluating unit also must send data of other nodes, besides their own data, this means that the amount of data generated is a multiple for the data traffic in the vicinity of the evaluating unit. To make it possible to pass through the signals faster in case of alarm, a transmission protocol is advantageously designed such that the data are sent immediately in case of an alarm. The case of alarm at a sensor node thus switches over to a cycle increase in the network for the necessary paths. The data of the evaluating unit can then be bundled in a central monitoring or alarm center. The sending may take place now over different transmission paths in order to link the data obtained on an alarm situation with suitable measures. Various forms of transmission protocols and other methods, some of which are known, are in turn available for sending the data from the site of the central evaluating unit.

In another advantageous embodiment, the measured data obtained by adjacent modules are subjected to a plausibility check in order to make it possible to filter out erroneous measured values. Thus, there is a further increase in the safety of the systems according to the present invention for measured data acquisition distributed in space. If at least three transmission paths per measured data acquisition are preset, it is, moreover, possible to take safety measures that make it possible to recognize the failure of an individual transmission path or the generation of errors on that transmission path by plausibility checks and comparisons with the at least two remaining transmission paths.

Another advantage of the system according to the present invention is the ease with which individual modules can be replaced. It is possible without problems, for example, after major damages, in which individual modules have been destroyed but the surrounding one continues supplying measured data, to install new modules shortly after the damage in the center of the damaged zone, which new modules can be integrated without problems in the existing sensor network by the initialization according to the present invention. Combined with a GPS system, it is possible, furthermore, to place such a module system, due to its ability to be removed quickly, in sections of the terrain in which there are no other possibilities of installation nor can additional position data be derived.

The present invention will be explained in greater detail on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
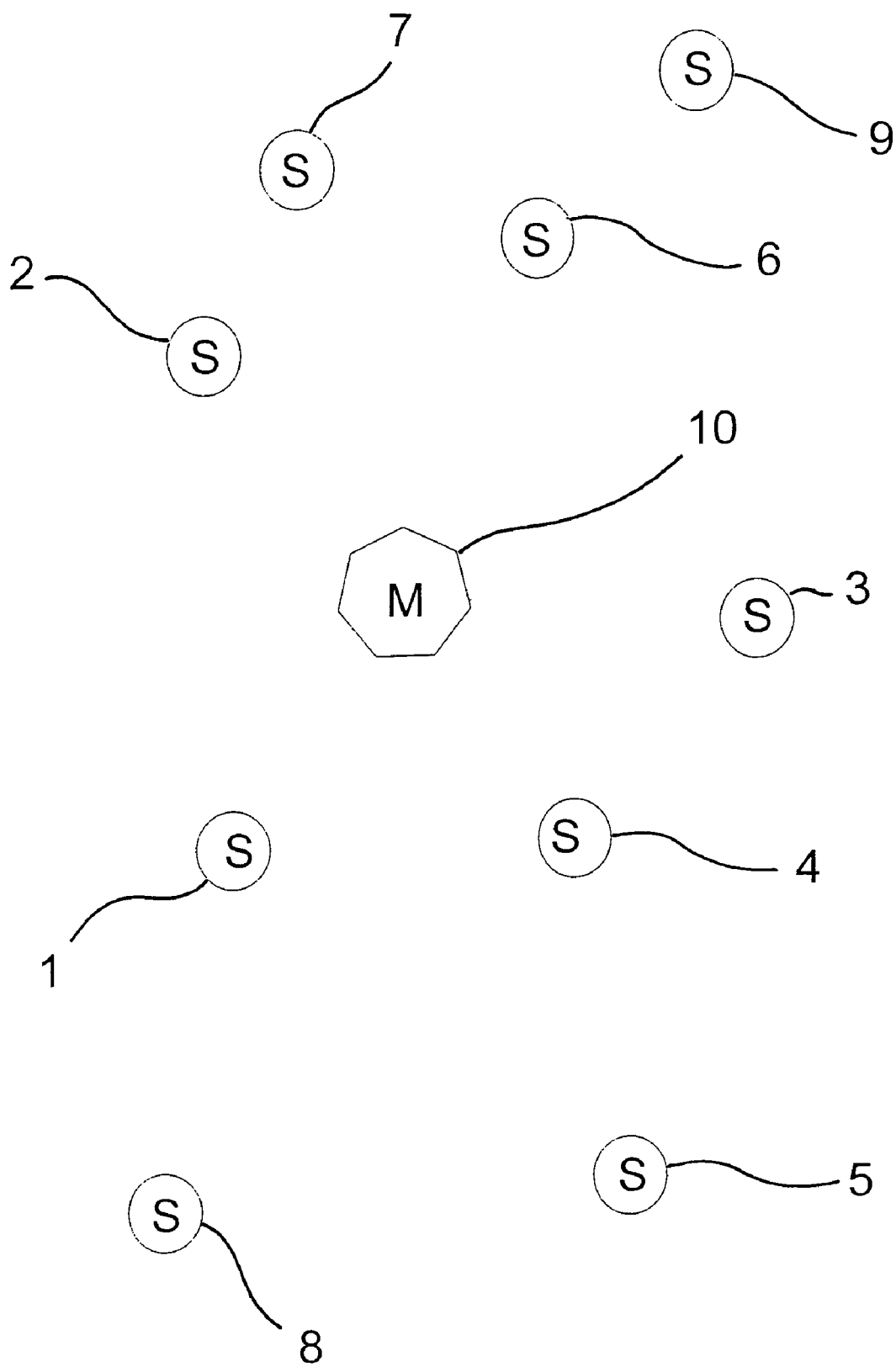
FIG. 1 is a schematic view showing an exemplary arrangement in space of modules according to the present invention around a central evaluating unit.

Referring to the drawings in particular, modules 1-9 according to the present invention, hereinafter also called sensors, are grouped in a random arrangement around a central evaluating unit functioning as a master 10. The number of modules may be varied almost as desired.

The processes taking place in a system according to the present invention, which lead to the formation of a redundant sensor network, will first be described in case of normal measuring operation.

The goal is to make available two paths to the master 10 or to a central evaluating unit for each sensor 1-9. More than two paths shall not be allowed in order to keep the amount of data generated as low as possible. The network is built up in the form of an initialization 8 in a plurality of steps.

Step 1:

The master 10 must know all participating sensors 1-9; identification numbers and the sites or temporary measuring places of the sensors 1-9 are entered for this purpose into the master system. Based on a building plan, a first check is performed in case of stationary systems to determine whether a sensor could not be able be reached in the radio network because of its position.

Special ranges of identification numbers are reserved for additional mobile participants (maintenance personnel with sensor).

The modes of signal transmission, which enable individual modules to operate simultaneously as a sensor and as a repeater, are deactivated at first in all sensors, which can be ensured by a standard setting. A response delay and a transmission delay are likewise not activated.

However, a sensor-specific transmission delay, for which the sensor waits in case of activation of the transmission delay until it sends data of other sensors, even measured data with code and time synchronization data, is coupled with each identification number. The delay times on the basis of the identification number are designed for the case of alarm.

Step 2:

The master 10 "calls" all sensors 1-9 one after another, first the sensors located close in space. These are the sensors 1, 2, 3 and 4 in the example. The sensors 5-9 located remotely are then polled.

All the sensors respond directly in this step; signal forwarding is still switched off.

As a result, the master 10 recognizes which of the sensors reporting to it cannot communicate with it directly bidirectionally.

Step 3:

The master 10 selectively "calls" the sensors that responded directly in Step 2.

It now activates the transmission mode with transmission delay without response delay, i.e., the particular sensor responds directly, the other sensors receive, just like the master, the response signal and send this without a delay, adding a site and time stamp.

The master thus receives the response of a sensor several times in the direct reception range, once directly and then indirectly with different time delays that are typical to the sensor.

The master thus knows via which paths the sensors located in its immediate surroundings can communicate with it and can assign to the sensors their specific direct or indirect path combination.

Step 4:

If a response came for each of the sensors 1-4 located in the immediate surroundings on a plurality of possible paths (>2), it is possible to insert yet another step, in which measurements of signal reception quality are also included, before the paths to be used are specified.

To do so, Step 3 is repeated such that the master 10 reduces its transmitting power by half in a Step A and asks the sensors to respond and then hears which sensors still send a response.

In a step B, it asks the sensors to send the response or to forward the data with half their transmitting power.

One alternative is the evaluation of field strength data at the receiver. The sensors can, for example, add the RSSI (Received Signal Strength Indication), which is made available, among other things, by many HF units, to the response in addition to the site and time stamp.

The master can, in turn, also use this technique itself to evaluate the quality of various radio paths of a sensor.

Unfavorable paths can thus be recognized and optimal paths can be selected for each sensor.

Step 5:

Path data, the specific response delay time and the transmission delay time are sent in this step to each sensor, i.e., for example, a routing table is set up and transmitted. The response delay and the transmission delay with which the individual sensor passes on signals from other sensors and whether individual paths are released or blocked appear from this.

The response delay and the transmission delay for the alarm mode are switched on for the sensors for which the communication parameters have been determined and are completely entered in the routing table.

Step 6:

When all sensors in the direct reception range have been detected, Step 2 through Step 5 are repeated until the communication parameters are determined for all known sensors, including those located at a great distance in the outside area of the sensor network.

For temporary stationary applications, for example, during maintenance work, the user is provided with data by means of the routing table if some sensors/modules must be positioned locally differently or additional modules must be integrated in order to put the network into operation.

The modular system is then configured as a sensor network for the operation. The communication of the sensors is coordinated with one another in time such that there is no data collision at the master. It is ensured that the communication functions for the case of an alarm. The alarm mode is advantageously tested during the phase of initialization such that all modules are in the state of alarm. To avoid collision, a mobile participant has a fixed coupling via the identification number with a time slot that is assigned to it and is reserved for it. Mobile participants are advantageously handled in the routing table as sensors that detect an alarm situation. The time cycle can be slowed down for normal operation. Based on a routing table, a transmission process is calculated and initialized for the normal operation, taking into account a preset number of mobile participants. This makes it possible to slow down the communication cycle to the normal cycle, which is embodied in a Step 7 by switching over to normal cycle.

In normal operation, the sensors forward the measured data of other sensors in addition to their own measured data and site and time stamp. Contrary to the normal operation, during which each sensor also adds its own measured data, only the transmission function of the sensor nodes is used in case of alarm, and measured data of their own are added only if the sensor node is also in the state of alarm itself.

A switchover to faster communication cycle is additionally performed for this in case of alarm.

This faster cycle rate was tested and set during the initialization.

The connection of mobile participants to the particular nearest measuring node is performed as in the alarm mode, but without obligatorily increasing the cycle frequency. Since data is always transmitted on the measuring node at which the connection of the mobile participant was just performed, the position of the mobile participants can also be monitored at the slower cycle of the normal operation, which is tantamount to tracking within the framework of the available position data. A protocol, which contains time and site data on defined checking states, is advantageously generated during the initialization and/or the operation of the modular system. The data contained therein can be used later for post-initialization at any time. Defined checking states are characterized, for example, by transmitting powers, receiving levels and other parameters affecting the communication.

Figure 2:
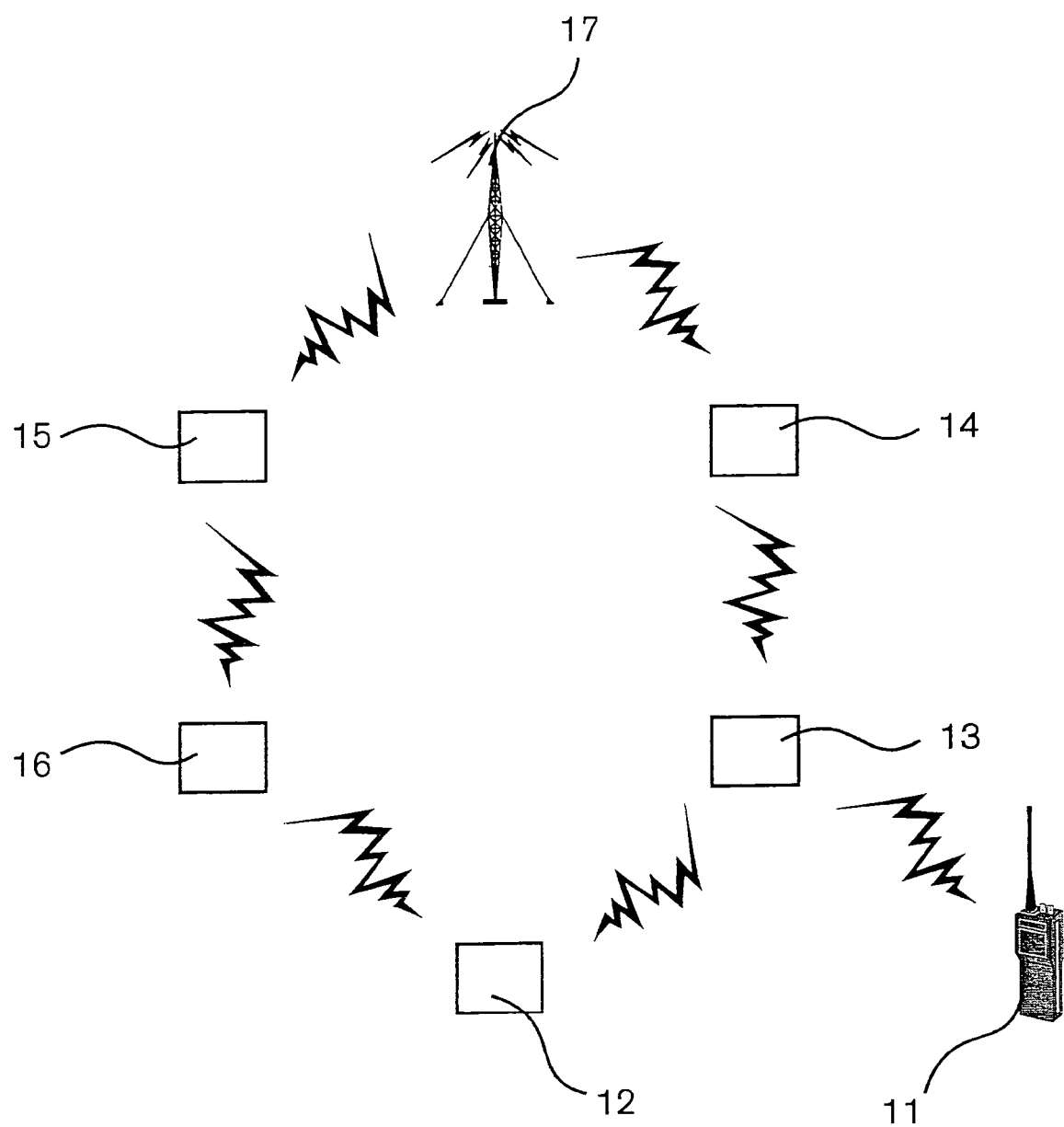
FIG. 2 is a schematic view of a system according to the present invention with a connected mobile participant.

FIG. 2 shows a schematic view of a system according to the present invention with a connected mobile participant 11. The system is completely initialized and ready for use. It comprises five modules 12-16, which can act each as a sensor and as a repeater, have an interface for connecting additional participants and can communicate each via two paths with a central evaluating unit 17. A mobile participant 11 is connected into the system via a radio interface of the module 13, and this participant likewise has, as a result, two paths for communication with the central evaluating unit 17. However, the transmission path between the mobile participant and the module 13 is not of a redundant design.

Figure 3:
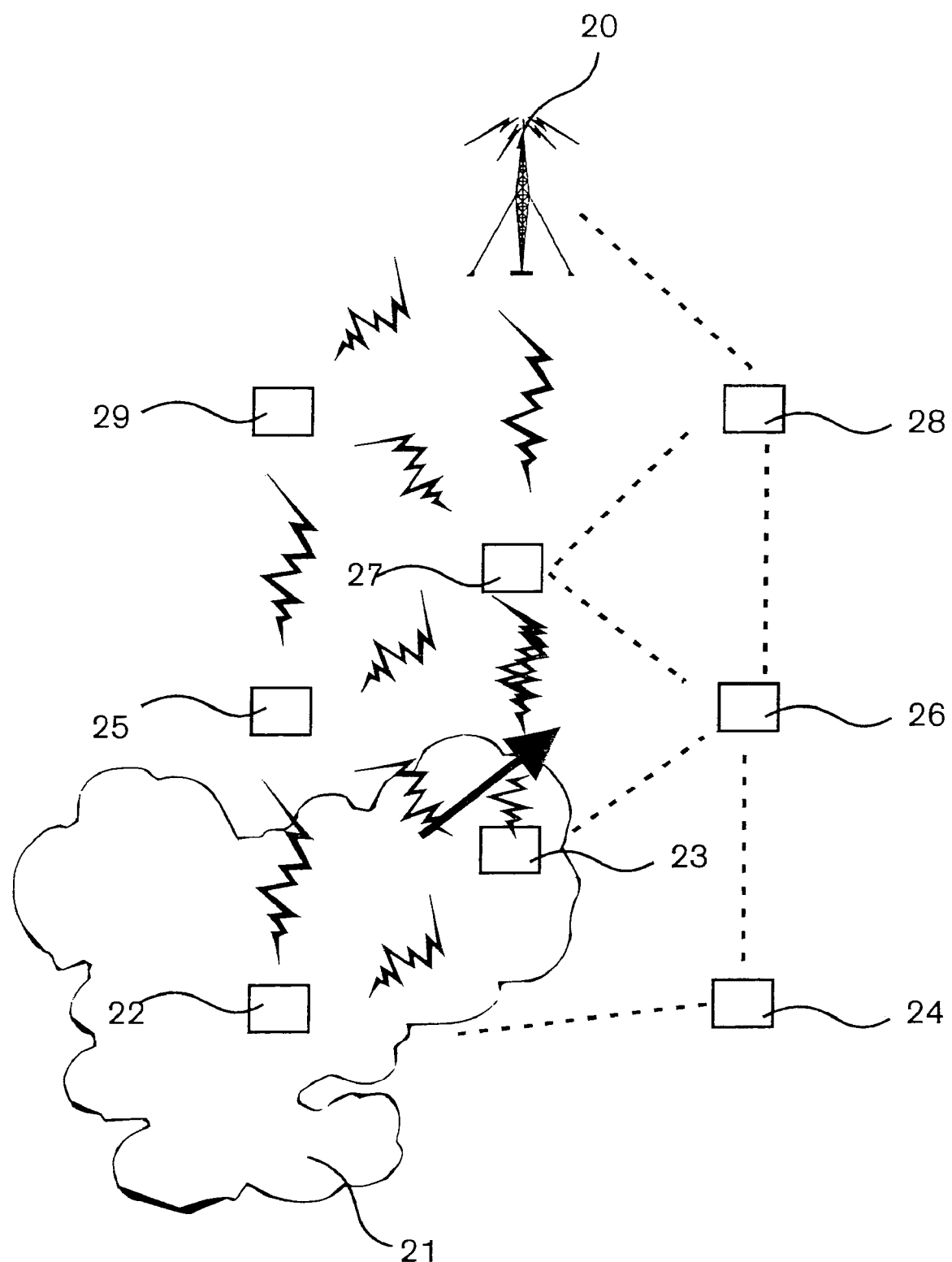
FIG. 3 is a schematic view of a system according to the present invention with event-controlled measured data obtaining.

FIG. 3 shows a schematic view of a system according to the present invention with event-controlled measured data obtaining. The system has a design similar to that in the preceding example and is completely initialized. However, transmission of measured data to the central evaluating unit 20 can be done away with after the initialization in such a system if none of the sensors detects a state that requires data transmission. However, a higher level of operational reliability can be achieved if the functionality is nevertheless monitored at regular intervals, for example, in a slowly cycled standby mode. At least corresponding paths or the entire network is switched over to a faster cycling alarm mode and data transmission is initiated only after the detection of a state that requires data transmission, for example, the appearance of a pollutant cloud 21.

A state with two sensors 22, 23 located in a pollutant cloud 21 is shown. The data detected by these sensors 22, 23 are transmitted to the central evaluating unit 20, the modules 25, 27, 29 being connected in transmission paths as repeaters, which are operated at a higher cycle frequency. Local measured data and data sent by other modules are transmitted by the modules 24, 26, 28 at a low cycle frequency only in this state. If the position of the pollutant cloud changes, other sensors can send measured data at a higher cycle frequency and other transmission paths can operate in the alarm cycle. The position and the direction of motion of a pollutant cloud can thus be monitored accurately by continuous comparison with cartographic data in an evaluating unit 17 and the pollutant concentration can be monitored at the same time.

Figure 4:
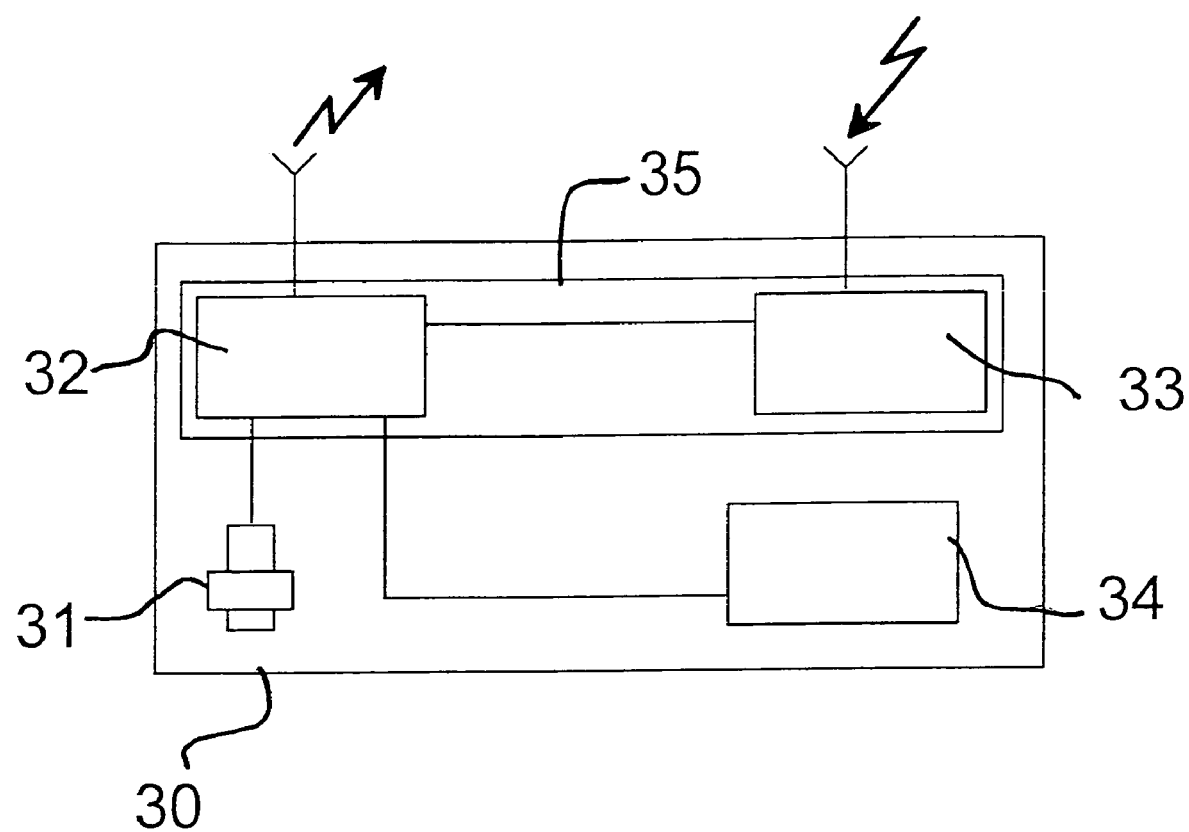
FIG. 4 is a schematic view showing the design of an individual module according to the present invention.

FIG. 4 schematically shows the design of an individual module according to the present invention. Such an individual module comprises a housing 30, in which an electrochemical gas sensor functioning as a means 31 for obtaining measured data, a transmitter functioning as a means 32 for sending the measured data by radio, a receiver functioning as a means 33 for receiving data sent by other units, and a means 34 for generating a transmissible code containing additional data, are arranged. The transmitter and the receiver together form a repeater 35.

Figure 5:
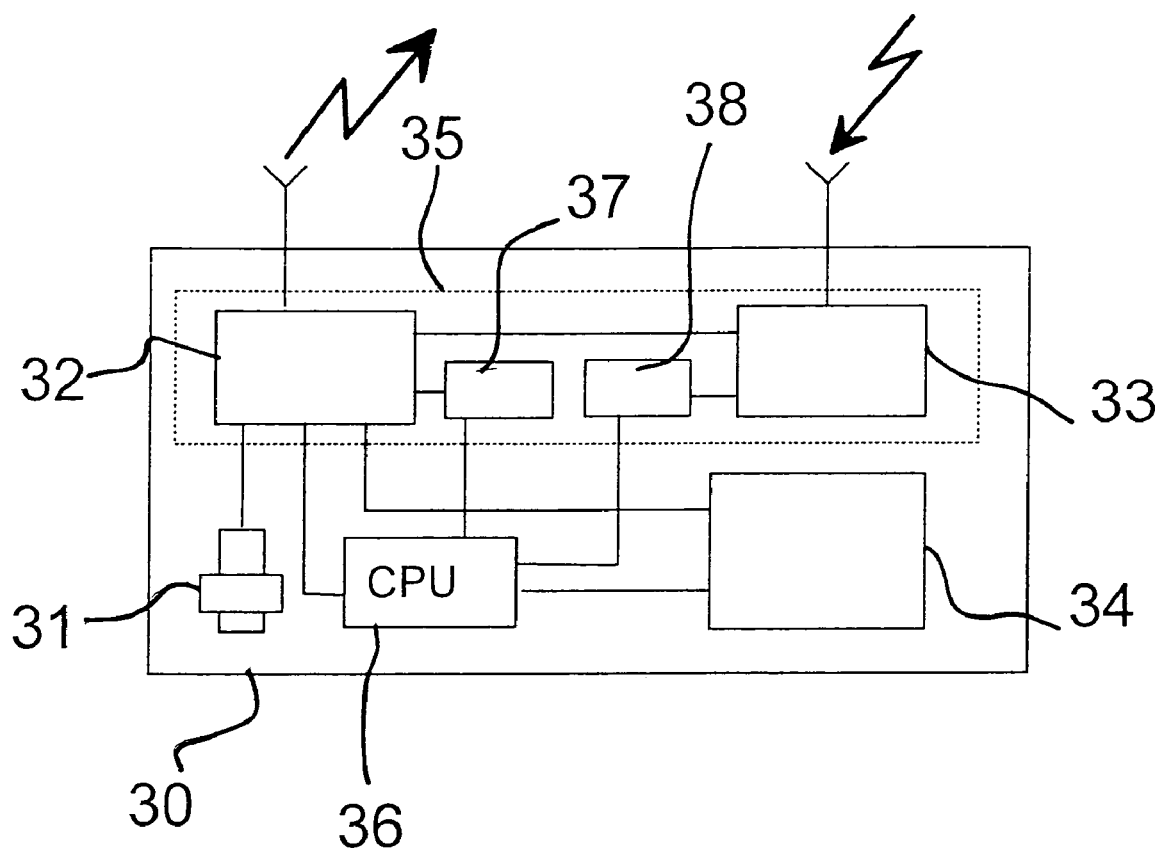
FIG. 5 is a schematic view showing the design of an individual module according to the present invention with expanded control possibilities.

FIG. 5 shows the schematic design of an individual module according to the present invention with expanded control possibilities. The module is additionally equipped with a control unit 36, which makes it possible to assign a master function to the module. In addition, the module is equipped with a setting unit 37 for setting the transmitting power and with a measuring unit 38 for measuring the receiving level.

While specific embodiments of the invention have been shown and described in detail to illustrate the application of the principles of the invention, it will be understood that the invention may be embodied otherwise without departing from such principles.

What is claimed is:

1. A modular system for obtaining measured data for forwarding such data in a radio-based manner, the system comprising:

units comprising a plurality of modules each having measured data means for obtaining measured data, a transmitting means for transmitting measured data by a radio signal, a receiving means for receiving data sent by other units, and means for generating a transmissible code containing additional data sent by said transmitting means that identifies a sending module and identifies by which module measured data transmitted were obtained, wherein said transmitting means and said receiving means together function as a repeater and wherein each module can function as a sensor for obtaining measured data, as a repeater for the radio-based forwarding of received data and as a master for collecting the data obtained and/or sent by the individual modules and for coordinating the transmission operation and for initializing the system when the particular function is assigned to the module, at least one module functioning as a master and having collecting means for collecting data obtained and/or sent by the individual modules and coordinating and/or initializing the transmission operation of the individual modules.

2. A modular system in accordance with claim 1, wherein said code containing additional data contains data on whether an alarm situation exists at a site of one said module or additional data on whether an alarm situation exists at a site of one said modules is sent by each said transmitting means.

3. A modular system in accordance with claim 1, wherein each transmitting means includes a transmitter in a state of rest at least partially during a state in which an associated said measured data means is obtaining measured data.

4. A modular system in accordance with claim 1, wherein said measured data means for obtaining measured data in at least some of said modules comprises an electrochemical gas sensor, an optical gas sensor or a pyroelectric gas sensor.

5. A modular system in accordance with claim 1, wherein a transmitting power of each said transmitting means can be set and/or remotely controlled.

6. A modular system in accordance with claim 1, wherein receiving levels of each said receiving means can be measured.

7. A modular system in accordance with claim 1, wherein said at least one module which functions as a master coordinates and/or initializes the transmission operation of the individual modules by providing a higher polling cycle in an alarm situation than in normal operation data or provides a forwarding of data from the modules at a higher cycle rate in an alarm mode than in the normal operation.

8. A modular system in accordance with claim 1, wherein said measured data means for obtaining measured data comprises an electrochemical gas sensor, an optical gas sensor or a pyroelectric gas sensor.

9. A process for obtaining measured data, comprising:

providing a system of units including a plurality of modules having measured data means for obtaining measured data, a transmitting means for transmitting measured data by a radio, a receiving means for receiving data sent by other modules, and a means for generating a transmissible code containing additional data, wherein said transmitting means and said receiving means together function as a repeater;
arranging said plurality of modules in an area;
providing one of said units to function as a master;
using the master to specify an initiation step in which modules function as sensors and obtain measured data and/or function as repeaters;
setting the function of individual modules such that all measured data obtained by a module will reach the master over at least two transmission paths, wherein at least one module functions as said master, wherein the function of the individual modules is set such that all the measured data that are obtained by a module will reach said master over said at least two transmission paths.

10. A process in accordance with claim 9, wherein the master is a central evaluating unit specifying in said initialization step which modules shall function as or also function as additional masters.

11. A process in accordance with claim 9, wherein the number of transmission paths is set at a number greater than 2.

12. A process in accordance with claim 9, wherein additional stationary or mobile modules are included in the system during the obtaining of the measured data.

13. A process in accordance with claim 9, wherein tracking of the mobile modules is performed by including cartographic data and the evaluation of a position at which the mobile modules are connected.

14. A process in accordance with claim 9, wherein a code, which contains at least data on which module the measured data were obtained by is added to the transmitted measured data.

15. A process in accordance with claim 9, wherein a code, which contains at least data on which module the data were forwarded by is added to the data forwarded.

16. A process in accordance with claim 9, wherein the transmitting power of the individual modules is set such that bidirectional use of the transmission paths is possible.

17. A process in accordance with claim 9, wherein the transmitting power of the individual modules is set such that a fixed number of transmission paths can be used between the individual modules and a central evaluating unit.

18. A process in accordance with claim 9, wherein the transmitting power of the individual modules is set such that at least two transmission paths can be used between the individual modules and a central evaluating unit.

19. A process in accordance with claim 9, wherein the transmitting power of the individual modules is set at a maximum of 10 mW.

20. A process in accordance with claim 9, wherein at least 90% of the monitoring period is used for data obtaining and at most 10% for data transmission.

21. A process in accordance with claim 9, wherein a higher polling cycle is used in an alarm situation than in normal operation.

22. A process in accordance with claim 9, wherein initialization is performed corresponding at least at the time when the modular system for obtaining measured data and forwarding them in a radio-based manner is put into operation.

23. A process in accordance with claim 9, wherein an alarm mode is tested during an initialization phase such that all modules are in the state of alarm.

24. A process in accordance with claim 9, wherein a protocol, which contains time and site data on defined checking states, is set up during the initialization and/or the operation of the modular system.

25. A process in accordance with claim 9, wherein the data are forwarded at a higher cycle rate in an alarm mode than in the normal operation.

26. A process for obtaining measured data, comprising:
providing a system of units including a plurality of modules having measured data means for obtaining measured data, a transmitting means for transmitting measured data by a radio, a receiving means for receiving data sent by other modules, and a means for generating a transmissible code containing additional data, wherein said transmitting means and said receiving means together function as a repeater;
arranging said plurality of modules in an area;
providing one of said units to function as a master;
using the master to specify an initiation step in which modules function as sensors and obtain measured data and/or function as repeaters;
setting the function of individual modules such that all measured data obtained by a module will reach the master over at least two transmission paths, wherein a fixed number of sensors and repeaters are initialized before the obtaining of the measured data.

27. A process for obtaining measured data, comprising:
providing a system of units including a plurality of modules having measured data means for obtaining measured data, a transmitting means for transmitting measured data by a radio, a receiving means for receiving data sent by other modules, and a means for generating a transmissible code containing additional data, wherein said transmitting means and said receiving means together function as a repeater;
arranging said plurality of modules in an area;
providing one of said units to function as a master;
using the master to specify an initiation step in which modules function as sensors and obtain measured data and/or function as repeaters;
setting the function of individual modules such that all measured data obtained by a module will reach the master over at least two transmission paths, wherein if a state of alarm is present, a code, which contains at least data on the fact that a state of alarm is present, is added to the measured data sent or comprises the data of the transmissible code containing additional data.

* * * * *